July 4, 1950     A. B. WEBB     2,513,765
MASHING AND LAUTERING APPARATUS FOR BREWING
Filed June 18, 1947     4 Sheets-Sheet 1

Inventor
Arthur B. Webb

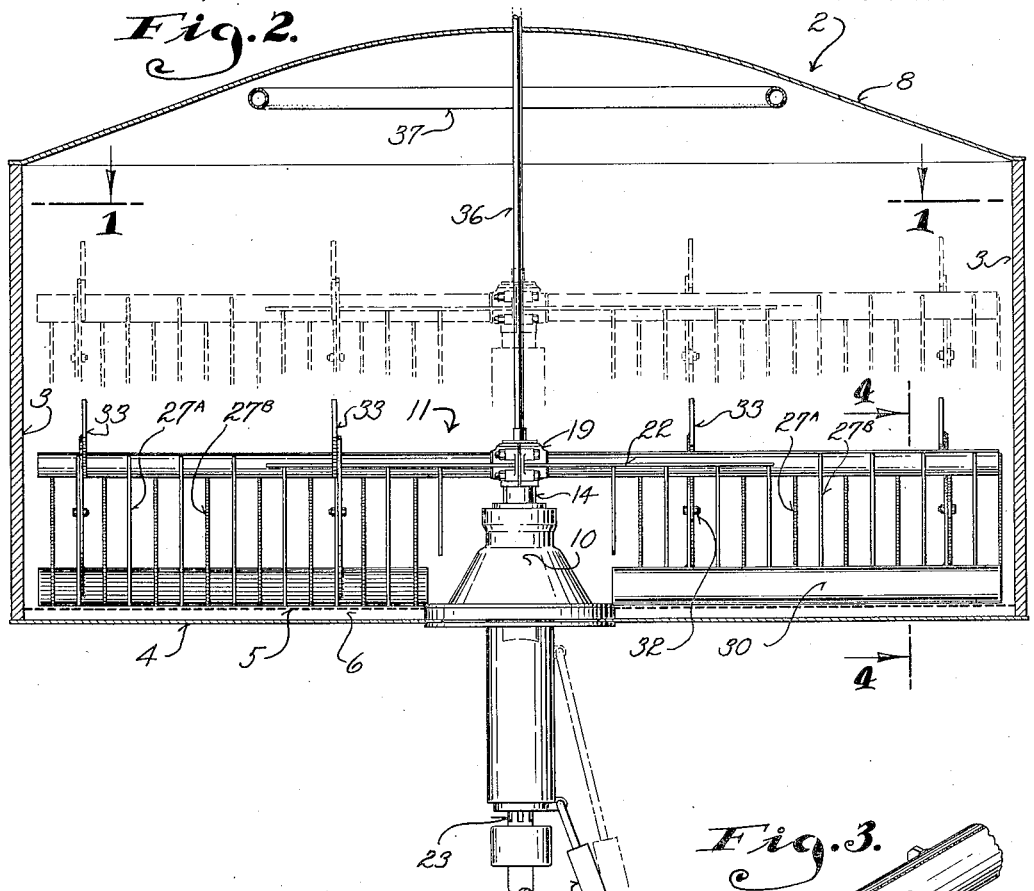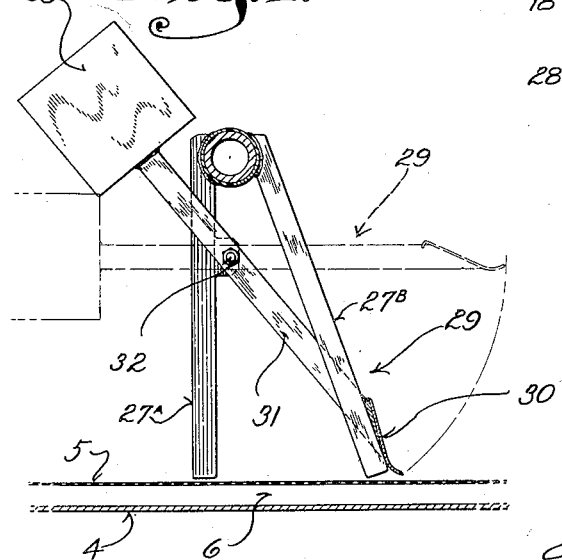

July 4, 1950     A. B. WEBB     2,513,765
MASHING AND LAUTERING APPARATUS FOR BREWING
Filed June 18, 1947     4 Sheets-Sheet 3

Inventor
Arthur B. Webb
By Ira Milton Jones
Attorney

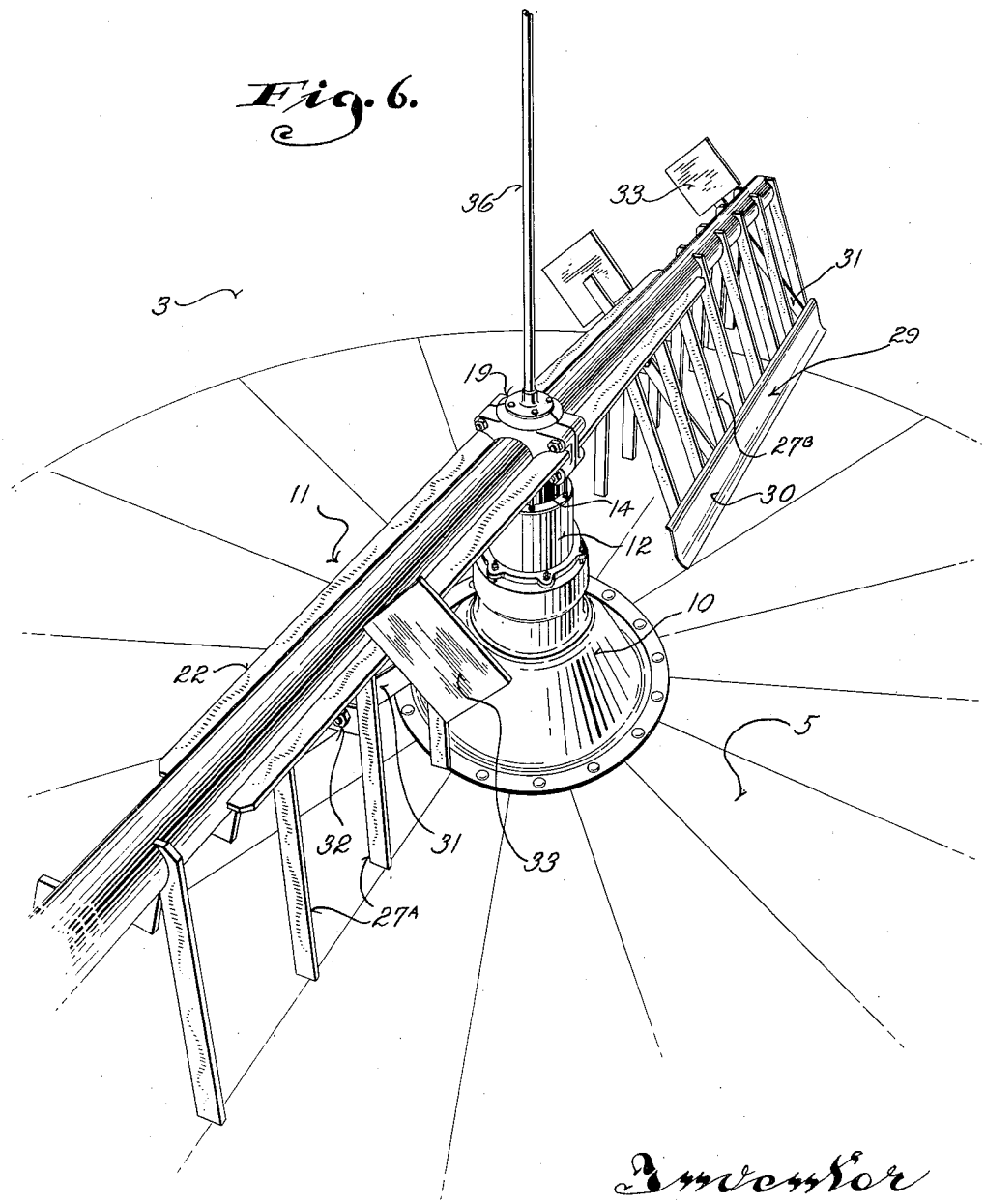

UNITED STATES PATENT OFFICE 2,513,765

MASHING AND LAUTERING APPARATUS FOR BREWING

Arthur B. Webb, Milwaukee, Wis., assignor to Cream City Boiler Company, Milwaukee, Wis., a corporation of Wisconsin Application June 18, 1947, Serial No. 755,289

9 Claims. (Cl. 259—107)

This invention relates to mashing and lautering equipment for use in brewing, and has as its general purpose to provide a combination mash and lauter tub or tank of simplified and improved construction.

Although this invention is primarily concerned with the construction of the aufhack or agitator which keeps the mash suitably agitated during mashing and lautering, and the plow or scraper by which the spent grain is swept out of the tank at the completion of the lautering off period, it will be advantageous to briefly outline the steps followed in mashing and lautering.

The mashing operation consists in cooking the grain in water to convert its starch content into sugar. This may be done in a separate tank, or as contemplated by the present invention the mashing and lautering may be done in the same tank.

Lautering is the drawing off of the extract or liquor from the bottom of the tank. During this procedure the mass is gently agitated, and towards the end of the lautering off, sparging water is sprayed over the contents to flush out all possible extract from the grain. At the completion of the lautering and sparging when all of the extract has been drawn off, the spent grain is discharged from the tank through a trap door in its bottom.

In the lautering off of the extract the bottom layer of the mass serves as a filter bed. Hence, it is extremely important that this bottom layer be left undisturbed. If it is broken or disturbed, the extract being lautered off becomes turbid. Such breaking of the bottom filter layer thus entails long periods of quiescence to allow the turbidity producing particles to settle out and enable the bed to reform.

Satisfactory lautering, therefore, poses two difficult problems. To assure flushing all the extract from the mash, it is essential that the sparging water reach all portions thereof, and this requires having the aufhack or agitator blades reach down into the mass as far as possible. On the other hand the bottom layer which serves as a filter bed must not be disturbed. It thus follows that the extent to which the agitator blades can be lowered bears a relationship to the spacing between adjacent blades, for blades that are spaced far apart can be brought down closer to the bottom without breaking the bottom layer than blades that are spaced closer together.

In the past the desired wide spacing between adjacent blades has been achieved by increasing the number of radial arms which carry the blades and, of course, staggering their radial distances from the axis of rotation so that the circular paths defined by the blades in operation are quite close together although the distance between adjacent blades is much greater. This obvious solution to the problem of effecting increased spacing between adjacent blades entailed the objection of having the inside of the tank cluttered up with mechanism.

As a result cleaning the tank became a tedious task. In such cleaning, the segmental screen sections which form the false bottom of the tank have to be lifted and are generally set up against the side wall of the tank. Inasmuch as these sections are quite large the presence of three (3) or more agitator arms inside the tank became a source of much inconvenience and irritation. Practically every time a screen section was lifted the agitator had to be moved.

With this objection in mind, the present invention has as one of its objects to provide an improved aufhack or agitator wherein only a single pair of arms carries all of the agitator blades, but in a manner spacing the operating portions of the blades and particularly the lower ends thereof far enough apart to preclude breaking the bottom filter layer, even though the blades are lowered to within a short distance from the false bottom.

As can be readily appreciated, the agitator blades in cutting through the relatively compacted mass, leave circular channels in their wake which if not closed allow the sparging water to by-pass portions of the mass with the result that all the portions of the grain are not flushed as effectively as desirable. Hence, it is another object of this invention to provide means for closing up the circular channels cut into the mass by the blades as they sweep around the tank.

More particularly it is an object of this invention to provide a novel trowel member adapted to ride upon the surface of the mass in a position trailing the agitator blades so as to close the circular channels formed by the blades.

Another object of this invention is to utilize the same structure for effecting the desired troweling action to also plow or scrape the spent grain into the discharge opening at the completion of the lautering off step and also serve as a mixing agitator during the mashing operation.

Another object of this invention is to so mount and arrange the combination plow and trowel structure that upon rotation of the agitator mechanism in one direction, this unit automatically assumes a position in which it serves as a mixing agitator during the mashing operation and as a plow or scraper to sweep the spent grain into the discharge opening upon completion of the lautering operation, while upon rotation in the other direction it is automatically lifted to a non-plowing and non-scraping position trailing the agitator blades and troweling the surface of the tank contents.

Inasmuch as the aufhack or agitator mechanism is preferably mounted in a relatively short pedestal rising up from the bottom of the tank so that the top of the pedestal is submerged in the tank contents, the matter of providing adequate lubrication for the working parts without danger of having the lubricant seep out into the tank contents has always presented a problem.

It is, therefore, a further object of this invention to provide an improved manner of lubricating the bearings and operating parts of the mounting structure of the aufhack or agitator whereby suitable lubrication is achieved from a single lubricant feeder port, without danger of having the lubricant seep out into the tank contents.

With the above and other objects in view which will appear as the description proceeds, this invention resides in the novel method, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 2 is a vertical sectional view through the tank;

Figure 3 is a detail perspective view showing the manner in which the individual agitator blades are mounted;

Figure 4 is a detail sectional view taken through Figure 2 on the plane of the line 4—4 and showing the manner in which the combination plow and trowel is mounted;

Figure 6 is a perspective view of the agitator mechanism.

Figure 1:
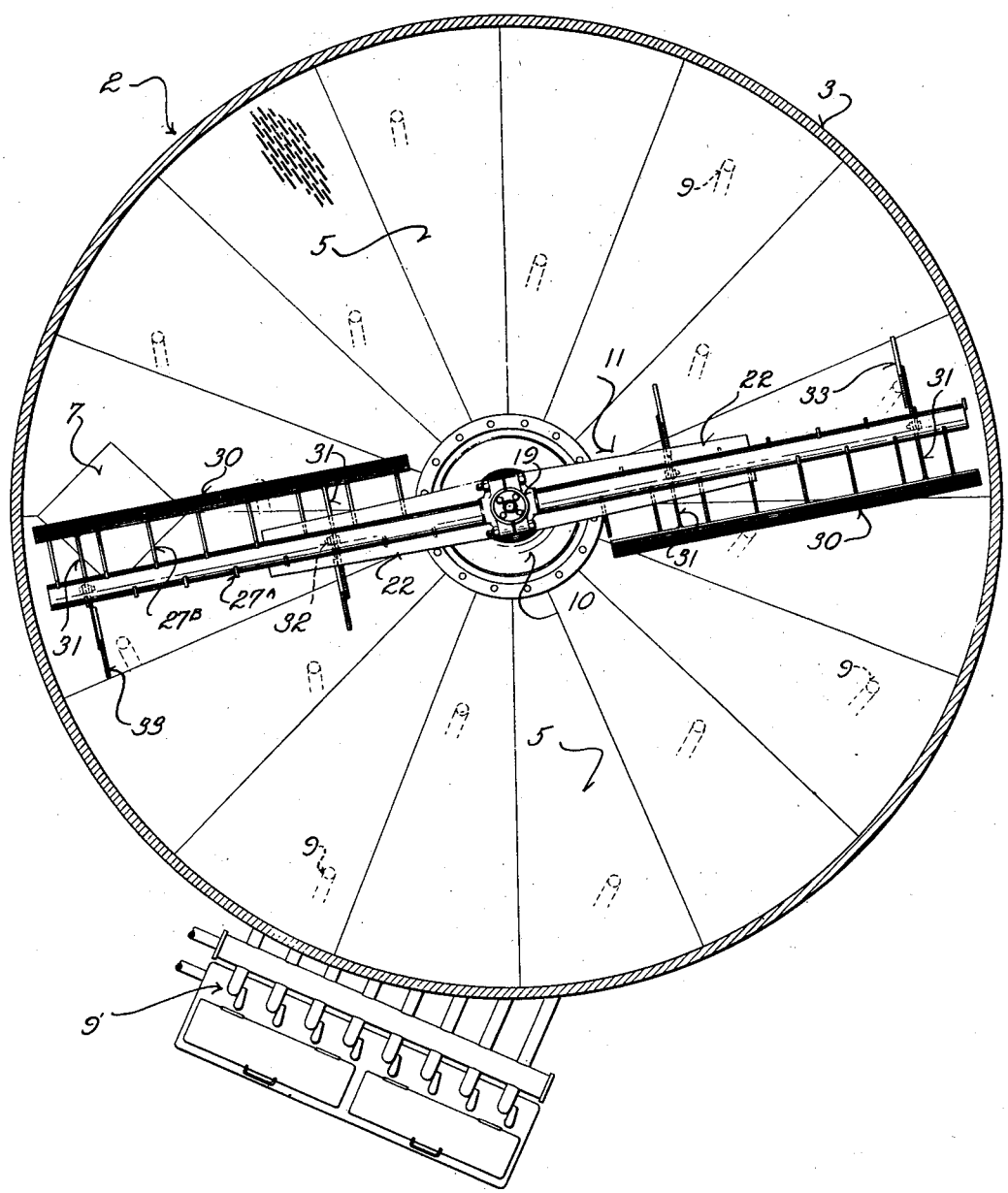
Figure 1 is a horizontal sectional view of a combination mashing and lautering tank embodying this invention, said view being taken on the plane of the ine 1—1 of the Figure 2.
Figure 5:
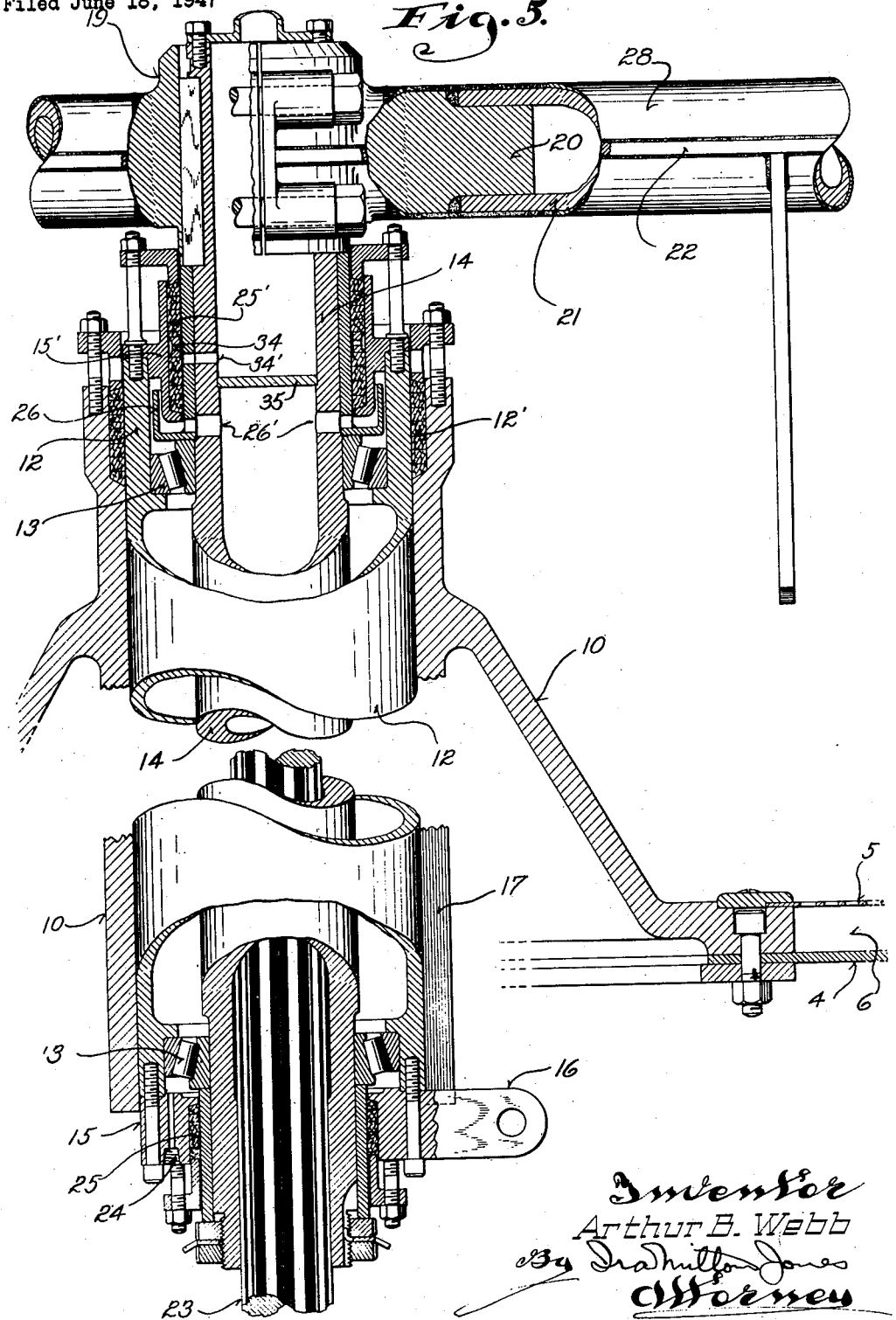
Figure 5 is an enlarged detail view partly in elevation and partly in vertical section showing the mounting of the agitator mechanism.

Referring now particularly to the accompanying drawings in which like numersl indicate like parts, the numeral 2 designates a generally cylindrical tank or tub having a side wall 3, a closed bottom 4 and a false bottom 5 perforated to allow seepage of liquid from the tank contents into the intervening space 6.

The false bottom 5 is made up of a number of individually removable plate segments which may be lifted and set against the side wall 3 during cleaning of the tank. Two of these segments have portions cut out to provide a discharge opening 7 for spent grain directly over a similar opening in the "true" bottom 4. This latter opening is controlled by a trap door (not shown). A cover 8 closes the open top of the tank, and steam jets (not shown) are arranged to discharge into the tank contents to supply the heat for cooking during the mashing operation in the event mashing is done in the tank 2.

The liquid extract lautered off the mash after the mashing operation is drawn off from the intervening space 6 by a plurality of gravitating conduits 9 connected with the bottom 4 and discharging into the usual grant 9' from which the liquor flows, under control of the attendant, to the wort pump (not shown).

Centrally of the tub or tank is a pedestal 10 which supports the aufhack or agitator mechanism indicated generally by the numeral 11. The aufhack or agitator mechanism is so mounted in the pedestal as to enable the same to be raised and lowered as well as rotated. To this end the pedestal has a sleeve 12 slidably received therein, the upper and lower ends of which support bearings 13 in which a hollow spindle 14 is journalled.

A collar 15 secured to the lower end of the sleeve has a tongue 16 projecting therefrom through a slot 17 in the central column of the pedestal. This tongue provides means for connecting the sleeve with the ram of a hydraulic cylinder 18 or any other suitable means for raising and lowering of the aufhack or agitator structure. The engagement of the tongue 16 in the slot 17 also serves to hold the sleeve 12 against turning.

Inasmuch as the upper end of the sleeve 12 protrudes from the top of the pedestal and projects into the tank contents, a packing 12' is secured in the upper end of the pedestal to preclude leakage of the tank contents between the sleeve and the bore of the pedestal.

The upper end of the hollow spindle 14 carries a hub 19. This hub preferably consists of two complementary half sections bolted together and each section has a boss 20 projecting radially therefrom upon which a pipe 21 is secured. The pipes 21 provide the two diametrically opposite arms of the aufhack or agitator mechanism. Reinforcement is provided for these arms by side plates 22.

Rotation in either direction, is imparted to the aufhack by a splined drive shaft 23 extending up into the hollow spindle 14 from the bottom and having a splined connection with the lower portion thereof.

To provide lubrication for the working parts of the aufhack supporting structure, the collar 15 at the bottom of the sleeve 12 has a lubricant inlet port 24. Lubricant introduced through this port is fed into the interior of the sleeve 12 to fill the same and reach both bearings 13. A packing 25 in the bore of the collar 15 precludes downward egress of the lubricant.

The lubricant which passes through the upper bearing 13 is free to enter a cup-like retainer 26 rotatable with the inner race of the upper bearing. This retainer opens to the interior of the hollow spindle 14 through ports 26' so that lubricant from the retainer may flow down to the splined drive shaft 23 to lubricate the same.

Egress of the lubricant from the upper end of the sleeve 12 is precluded by a packing 25' in the bore of a collar 15' fixed to the upper end of the sleeve. The packing 25' has an annular relief passage provided medially of its ends by a ported ring 34. This relief passage communicates with the interior of the upper end of the hollow spindle 14 through a port 34'.

Thus inasmuch as the upper end of the spindle bore is closed off from its lower portion by a partition 35 and is vented through its top, any fluid from the tank contents or lubricant from the retainer 26 which may work past the packing 25' passes through the port 34'. The passage of lubricant into the tank contents and the seepage of liquid from the tank contents into the lubricant chamber provided by the interior of the sleeve 12, is thereby effectively prevented; and at the same time lubricant applied at a single point assures adequate lubrication for all working parts of the aufhack mounting.

The agitator arms 21 carry sets of blades 27a and 27b. These blades are preferably made of flat bar stock, and are mounted to move edgewise through the tank contents. All of the blades of the "a" groups are disposed substantially vertically, while those of the "b" groups are disposed at an inclination to the vertical. Consequently, adjacent blades are spaced far apart at their lower ends though supported from the same arm, and inasmuch as the blades on one arm are staggered in their radial distances from the axis of rotation with respect to the blades of the other arm, the paths defined by the blades collectively lie close together to insure covering a large area but without danger of deranging the filter bed layer directly overlying the false bottom 5.

While the blades may be welded or otherwise secured directly to the pipes 21, it has been found convenient to first weld each group of blades to half a tube section 28 and then weld the two tube sections 28 to the pipe 21.

Pivotally mounted on two of the vertically disposed blades 27a of each arm of the aufhack is a combination plow and trowel member 29. This combination plow and trowel member comprises a relatively narrow blade 30 with two attaching arms 31 extending upwardly therefrom. The arms 31 are pivoted as at 32 to the adjacent blades 27a and extend beyond these pivots to support counterbalancing weights 33.

These structures are so balanced that when free they assume dependent positions at which the blades 30 rest against and are supported by the lower end portions of the inclined blades 27b. Hence the lower edges of the blades 30 can be brought close to the false bottom 5 by lowering the aufhack. In this dependent position, with the aufhack in any desired position of elevation, the blades serve as mixing agitators to keep the mash stirred up during the mashing or cooking operation, it being understood that for this purpose the direction of rotation is clockwise as viewed in Figure 1. In this dependent position the blades 30 also serve as plows or scrapers to scrape or sweep the spent grain through the discharge opening 7 provided, of course, that the trap door is open.

As will be readily appreciated by those skilled in brewing, the aufhack is preferably raised at the completion of the lautering operation to lift all its blades out of the mash, and after the trap door in the bottom of the tank is opened the aufhack is rotated clockwise (as viewed in Figure 1) and gradually lowered to slowly bring the blades 30 into the mash and progressively scrape the upper layer thereof into the discharge opening until all of the spent grain has been swept from the tank, at which time the blades 30 are substantially riding upon the false bottom 5.

From the description thus far it will be seen that the aufhack structure of this invention accomplishes its intended functions in a simple manner. During the mashing operation rotation thereof in the clockwise direction (as viewed in Figure 1) with its blades 30 in their dependent positions secures thorough mixing. The cutting up (aufhacking) or agitation of the mash during lautering is gently effected by the edge-wise movement of the finger-like blades 27a and 27b through the mash as the aufhack rotates in the opposite or counterclockwise direction (as viewed in Figure 1) and merely by again reversing the direction of rotation the blades 30 automatically assume their plowing or scraping positions to progressively sweep the spent grain into the opened trap door as the aufhack rotates and is gradually lowered.

Heretofore the switching over from one function to another was not nearly so simple, especially the switching from agitation to scraping. In some cases scraper blades were permanently fixed to the aufhack which, of course, precluded gentle agitation by means of the aufhack during lautering. In an effort to overcome this disadvantage the agitator blades were made rotatable about their individual axes, permitting them to be turned from positions disposed edgewise to their paths of movement through the mash to positions broadside thereof.

This arrangement entailed stopping the aufhack in an accurately defined location at which the means for adjusting the individual blades, which generally included a hand wheel, was brought opposite a door in the tank. Such accurate stopping of the aufhack was difficult and in addition the operator had to reach into the hot tank interior and manipulate the hot hand wheel.

Another attempt of the prior art to overcome the disadvantages of past arrangements consisted in mounting the agitator blades from one set of aufhack arms and the scraper blades on another set of such arms with the hubs of these two sets of arms arranged to enable one set to be lowered while the other was raised, and vice versa. The objection to such independent mounting of the agitator and scraper blades is twofold. Not only does it complicate the mounting of the radial arms, but it increases the number thereof.

In contra-distinction the counter-balanced pivotal mounting of the combination trowel and plow members 29 in the manner described achieves optimum simplicity obviating all manual manipulations beyond merely actuating suitable push button switches which control the starting and stopping of the aufhack and its direction of rotation. The freedom of the combination trowel and plow structures to assume positions at which their blades 30 rest against and are supported by the lower end portions of the agitator blades 27b assures that the blades 30 will automatically dig down into the mash to progressively sweep or plow the spent grain into the open discharge opening, and by virtue of this pivotal mounting and the spacing of the blades 30 from their pivots 32 the reaction of the material against the blades 30 as the aufhack turns in the opposite direction automatically lifts the blades from their mixing and scraping positions.

Not only does mere reversal in the direction of rotation automatically lift or raise the blades out of their mixing and scraping positions in which positions, if retained, they would interfere with gentle agitation of the mash during lautering but also upon being so lifted the blades 30 trail behind the finger-like blades 27a and 27b to ride upon the surface of the mash as indicated in dotted lines in Figure 4. Dragged along behind in this manner the blades 30 have a troweling effect which closes the circular grooves cut into the mash by the blades 27a and 27b and precludes channeling of the sparging water to the bottom of the tank contents.

To afford visual indication of the depth at which the agitator mechanism is operating, an indicator rod 36 extends up from the hub 19 to project through the cover 8.

The sparging water used to flush out the extract may be introduced in any suitable way, but is generally sprayed from a spray coil 37 mounted above the tank (Figure 2) and connected with a source of sparging water (not shown).

From the foregoing description taken in connection with the accompanying drawings, it will be readily apparent that this invention provides a substantial improvement in mashing and lautering tubs or tanks used in brewing; and that it especially simplifies the construction of the aufhack which forms an important part of such tanks.

What I claim as my invention is:

1. A rotatable aufhack member for lautering tanks; comprising: rigid arms extending out from the axis of rotation; spaced agitator blades fixed to and depending from said arms; a combination plow and trowel member for each arm; and means pivotally connecting said combination plow and trowel members with their respective arms in a manner enabling the combination plow and trowel members to swing freely between a plowing or scraping position adjacent to the lower ends of the agitator blades and a trowelling position trailing the agitator blades and riding upon the surface of the tank contents to close the channels formed by the agitator blades.

2. In a lautering tank, a rotatable aufhack member comprising: a vertical shaft mounted for rotation in either direction; diametrically opposite arms carried by and extending out from the shaft; and a plurality of rigid agitator blades immovably fixed to and depending from each of said arms, adjacent blades being disposed at divergent angles to one another so that the distance between adjacent blades increases toward their lower ends, said blades being set to move edgewise in circular paths as the aufhack member turns, and the blades of one arm being staggered in radial distance from the axis of rotation with respect to the blades of the other arm.

3. In a lautering tank a rotatable aufhack member, comprising: a vertical shaft mounted for rotation in either direction; diametrically opposite arms carried by and extending out from the shaft; and a plurality of rigid agitator blades immovably fixed to each of said arms at substantially equi-spaced intervals along the length of the arms, said blades depending from the arms and the blades of each arm being divided into two groups with alternate blades in one group and the intervening blades in the other group, the blades of one group lying in a plane at an angle to the plane collectively defined by the blades of the other group so that the lower free ends of adjacent blades are spaced apart considerably more than their upper anchored ends.

4. The structure set forth in claim 3 further characterized by the fact that the blades of each group are welded to separate carrier members, channel shaped in cross section and which carrier members are secured to and embrace diametrically opposite portions of each arm.

5. In a lautering tank, an aufhack structure comprising: an upright drive shaft rotatable in either direction; an arm extending radially from the shaft to turn therewith; a scraper blade hingedly carried by the arm so that the scraper blade is free to be automatically swung in one direction by the resistance of the tank contents from a scraping position depending from the arm to a trowelling position trailing the arm in one direction of rotation of the drive shaft and agitator blades immovably fixed to and depending from the arm at radially spaced intervals, certain of said blades being positioned to limit swinging movement of the scraper blade in the other direction and thus support the same in its scraping position during rotation of the aufhack structure in the opposite direction.

6. A combination mashing and lautering apparatus, comprising: a round tank; an upright shaft rising up from the bottom of the tank at the center thereof and rotatable in either direction; an arm extending radially from said shaft to turn therewith; a horizontal blade of a length to sweep the radius of the tank; means supporting the horizontal blade from the arm and permitting the blade to swing freely between a dependent position at which the blade is imbedded in the tank contents and a lifted position riding upon the surface of the tank contents and enabling the reaction of the tank contents against the blade to automatically swing the blade from one of said positions to the other and vice versa as the direction of rotation is changed; and means for limiting the swinging movement of the blade in one direction and supporting the same in its dependent position.

7. The structure set forth in claim 6 further characterized by the provision of: means mounting the upright rotatable shaft for up and down movement; and means located beneath the tank and connected with the shaft for effecting up and down movement thereof to enable raising the shaft and its arm to an elevation at which the horizontal blade is lifted out of the tank contents and gradual lowering thereof from said elevated position to enable the horizontal blade to progressively sweep the topmost layer of material into a discharge opening in the bottom of the tank.

8. A combination mashing and lautering apparatus for use in brewing, comprising: a round tank; a shaft projecting up through the bottom of the tank at the center thereof and rotatable in either direction; two arms extending in opposite directions from said shaft and rotatable therewith; a combination mixing, plowing and trowelling blade for each arm, said blades together having a length to sweep the entire bottom area of the tank; means connecting said blades with their respective arms and enabling the blades to swing freely between dependent positions capable of a mixing and plowing or scraping action and trowelling positions riding upon the surface of the tank contents, whereby the reaction between the tank contents and said blades automatically brings said blades into their mixing-plowing positions during rotation of the arms in one direction and automatically lifts said blades into trailing positions riding upon the surface of the tank contents to effect a trowelling action during rotation of the arms in the opposite direction; and means rigidly fixed to each arm and operable to support the blade hung therefrom in its mixing-plowing position.

9. In a mashing and lautering tank, a rotatable aufhack structure comprising: a plurality of fingers and means mounting the fingers for rotation about the axis of the aufhack structure and at different radially spaced distances from said axis with each finger rigidly depending from its support; a horizontal blade of a width considerably less than the height of said fingers and of a length to encompass the full sweep of said fingers; means hingedly mounting the horizontal blade for bodily swinging movement about an axis perpendicular to the axis of the aufhack structure and near the horizontal plane coinciding with the tops of said fingers; and means for limiting swinging movement of the horizontal blade in one direction and supporting the same in a dependent position in which its lower edge moves in a horizontal plane near that coinciding with the bottoms of the fingers so that as the aufhack turns in one direction said blades are capable of mixing and scraping, and from which position the horizontal blade may be automatically lifted by the reaction of the tank contents so as to ride upon the surface thereof upon reversal in the direction of aufhack rotation.

ARTHUR B. WEBB.

REFERENCES CITED

The following references are of record in the file of this patent:

UNITED STATES PATENTS

| Number | Name | Date |
|---|---|---|
| 1,166,599 | Keller | Jan. 4, 1916 |
| 1,298,544 | Montalto | Mar. 25, 1919 |
| 1,450,900 | Holthoff | Apr. 3, 1923 |

FOREIGN PATENTS

| Number | Country | Date |
|---|---|---|
| 6,700 | Switzerland | Apr. 22, 1893 |
| 38,134 | Switzerland | Sept. 5, 1906 |
| 20,660 | Germany | Feb. 12, 1883 |
| 70,391 | Germany | Aug. 18, 1893 |